United States Patent [19]

Shields et al.

[11] 3,795,423
[45] Mar. 5, 1974

[54] ADAPTIVE BRAKING MODULATOR

[75] Inventors: Martin A. Shields; David A. Jackson, both of South Bend, Ind.

[73] Assignee: The Bendix Corporation, South Bend, Ind.

[22] Filed: Sept. 18, 1972

[21] Appl. No.: 289,930

[52] U.S. Cl.................................. 303/6 C, 303/21 F
[51] Int. Cl.............................................. B60t 8/12
[58] Field of Search...................... 303/6, 21, 61–63, 303/68–69, 10, 84 R, 13, 15; 188/181, 349, 152, 151 A; 91/434

[56] References Cited
UNITED STATES PATENTS

| | | | |
|---|---|---|---|
| 3,695,732 | 10/1972 | Stelzer | 303/6 C |
| 3,603,209 | 9/1971 | MacDuff | 91/434 |
| 3,515,440 | 6/1970 | Every et al. | 303/21 F |
| 3,567,290 | 3/1971 | Liggett et al. | 303/6 C |

*Primary Examiner*—Duane A. Reger
*Assistant Examiner*—D. C. Butler
*Attorney, Agent, or Firm*—Ken C. Decker; William N. Antonis

[57] ABSTRACT

An adaptive braking system for an automotive vehicle is disclosed which permits the proportioning unit valve commonly used in vehicle braking systems to also function as the adaptive braking modulator. The device provides a fluid motor which engages the proportioning piston and urges the latter into sealing engagement with the poppet member to prevent fluid communication to the brakes of the vehicle when an adaptive braking cycle has initiated. Thereafter, the fluid motor continues to urge the proportioning piston in a direction enlargening the outlet chamber of the proportioning valve, to thereby reduce the fluid pressure level communicated to the vehicle brakes. An electrically actuated solenoid valve is responsive to an output signal from an electronic control unit when an adaptive braking cycle is initiated to communicate fluid pressure to the fluid motor for operating the latter.

5 Claims, 3 Drawing Figures

ADAPTIVE BRAKING MODULATOR

BACKGROUND OF THE INVENTION

This invention relates to a modulator for use in an automotive adaptive braking system.

A modulator is necessary in an automotive adaptive braking system to control the fluid communication to the controlled brakes of the vehicle to prevent skidding of the latter. Heretofore, most adaptive braking modulators have been rather sophisticated designs and have consequently become quite expensive to manufacture. For this reason, adaptive braking systems have not found wide acceptance in the automotive industry. Also, many vehicle braking systems are provided wtih a proportioning valve which reduces braking pressure communicated to the rear wheel brakes to make them compatible with the front wheel brakes. These proportioning valves have been widely used for a number of years and consequently may be manufactured at a relatively low cost. The present invention proposes using the proportioning valve as a part of the adaptive braking modulator, so that the cost of the latter may be reduced.

SUMMARY OF THE INVENTION

Therefore, an important object of our invention is to substantially reduce the cost of an adaptive braking modulator.

Another important object of our invention is to enable the conventional brake proportioning valve used in many existing brake systems to also function as an adaptive braking modulator.

Still another important object of our invention is to provide a differential pressure operated fluid motor for controlling actuation of a proportioning valve, so that the latter may be used as an adaptive braking modulator.

A still further object of our invention is to provide a brake proportioning valve used in existing braking systems with a differential fluid pressure motor for operating the latter and also to provide an electrically actuated valve that is responsive to the output signal of an electronic control unit for communicating a pressure differential across the fluid motor.

DETAILED DESCRIPTION

Figure 1:
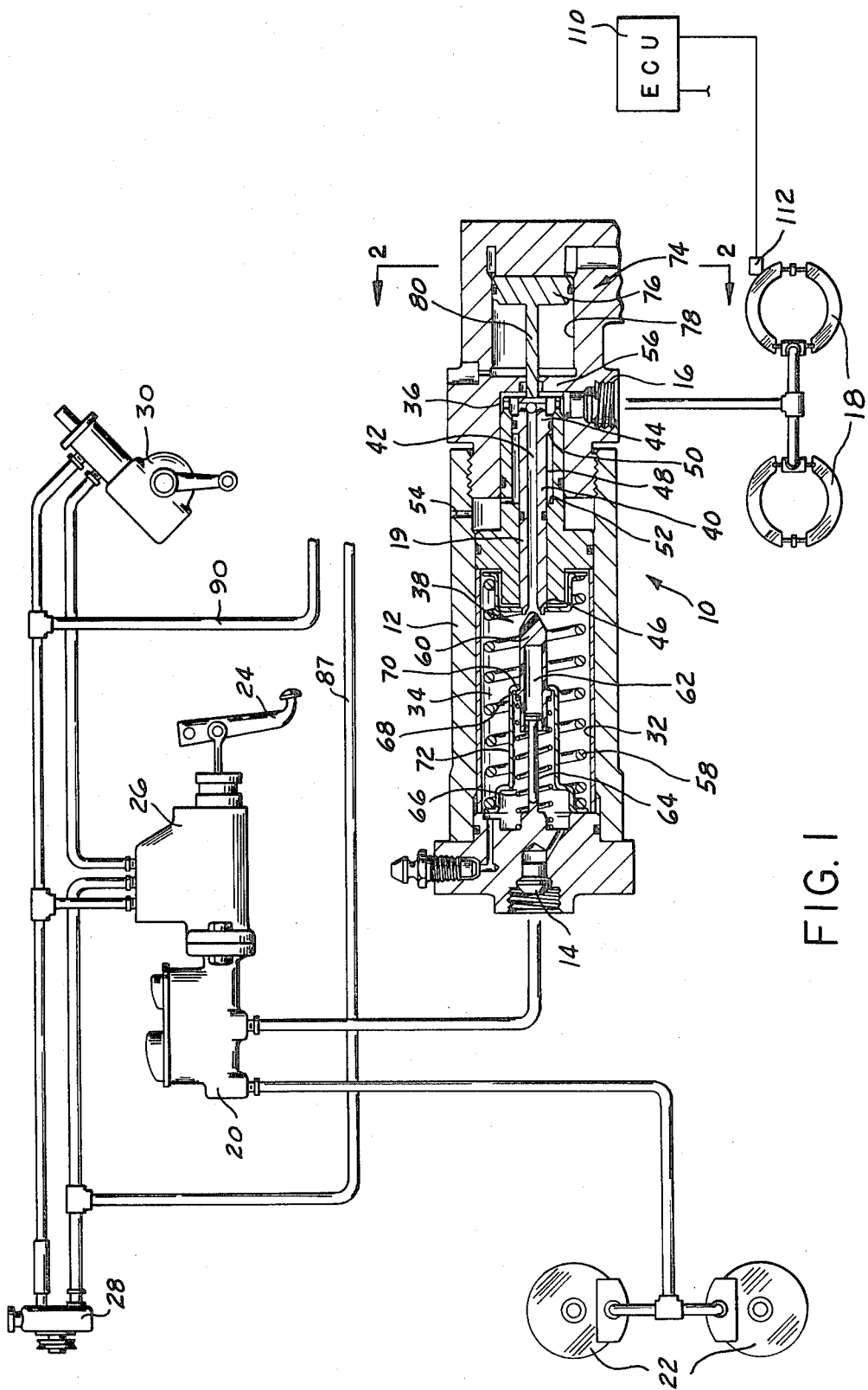
FIG. 1 is a schematic illustration of a braking system made pursuant to the teachings of our present invention with the fluid motor actuated proportioning valve used therein illustrated in cross section.

Referring now to the drawings, a combination brake proportioning valve and adaptive braking modulator generally indicated by the numeral 10 includes a housing 12 having an inlet port 14 and an outlet port 16. The outlet port 16 is communicated to the rear wheel brakes 18 of the vehicle. The inlet port 14 is communicated to one side of a conventional automotive split system master cylinder 20 which develops hydraulic pressure in the braking system in the conventional manner. The other side of the master cylinder 20 is connected to the front wheel brakes 22 of the vehicle. The master cylinder 20 is actuated by the vehicle operator by operation of a conventional pedal 24, which is mounted in the operator's compartment of the vehicle. A hydraulic brake booster 26 is provided which includes a pressure chamber (not shown) which provides a power assist to the vehicle operator in operation of the master cylinder 20. The hydraulic booster 26 may be of any conventional design, such as the one disclosed in U. S. Pat. No. 3,603,209, owned by the assignee of the present invention and incorporated herein by reference. The booster disclosed in the aforementioned patent utilizes the fluid pressure output of the vehicle power steering pump 28 to develop hydraulic pressure to provide the power assist in the pressure chamber of the hydraulic brake booster. The hydraulic booster 26 is connected in the same hydraulic circuit with the vehicle's power steering gear 30 so that the fluid pressure output for the pump 28 may be used to both actuate the hydraulic brake booster 26 and the power steering gear 30.

Referring again to the valve 10, the housing 12 defines a bore 32 therewithin which is divided into an inlet chamber 34 and an outlet chamber 36 by valve elements generally indicated by the numeral 38. Valve elements 38 include a proportioning piston 40 which is provided with an axial passage 42 therewithin which communicates the chamber 34 with the chamber 36. The valve piston 40 is stepped to present a larger diameter end 44 exposed to the fluid pressure level in the chamber 36 and a smaller diameter end 46 exposed to the fluid pressure level in the chamber 34. The cavity 48 which is defined between the shoulder 50 on the proportioning piston 40 and a similar shoulder 52 on the housing 12 is vented to the exterior of the housing 12 by a vent passage 54. The proportioning piston 40 is urged into the position illustrated in FIG. 1, with the rightwardmost end of the piston 40 engaged with the end 56 of the chamber 36, by a spring 58.

Valve elements 38 further include a poppet member 60 which cooperates with the axial passage 42 in the proportioning piston 40 to control fluid communication therethrough, as will be described in detail hereinafter. The poppet member 60 includes an internal recess 62 which is slidably received upon a support member 64 which forms a part of the housing 12. A spring 66 urges the abutment 68 on the poppet member 60 into engagement with a corresponding abutment 70 on a retainer member 72 carried in the bore 32, so that movement of the poppet member 60 to the right is limited, but movement of the poppet member 60 to the left viewing FIG. 1 is permitted.

The valve 10 is operated during an adaptive braking cycle by a fluid motor generally indicated by the numeral 74. The fluid motor 74 includes a piston 76 slidably mounted in a bore 78 defined within the housing 12. A rod 80 extends from the piston 76 and projects through the end 56 of the chamber 36 to engage the end 44 of the proportioning piston 40. The fluid motor 74 is actuated by communicating fluid pressure into a chamber 82 defined between the right hand end of the piston 76 (viewing FIG. 1) and the end of the bore 78. Fluid communication into the chamber 82 for actuating the piston 76 is controlled by an electrically actuated valve generally indicated by the numeral 84. The valve 84 includes an inlet port 86 which is communicated to the high pressure fluid at the inlet of the brake booster 26 through a conduit 87 so that the port 86 is always supplied with high pressure fluid whenever the brake booster 26 is actuated. The valve 84 further includes an outlet or return port 88 which is communicated to a reservoir (not shown) at the inlet or low pressure side of the power steering pump 28 through the conduit 90. The control valve 84 further includes a pair of opposed valve seats 92, 94. The valve element 96 is disposed between the seats 92 and 94, and a spring 98 and a plunger 100 normally cooperate to urge the valve element 96 into sealing engagement with the valve seat 92 and away from the valve seat 94 to permit the chamber 82 to communicate with the low pressure side of the pump 28 and to prevent communication of high pressure fluid from the port 86 into the chamber 82. An electrically actuated solenoid generally indicated by the numeral 102 includes an armature 104 which is movable toward and away from a magnetic pole piece 106 which is integral with the valve seat 92. Solenoid 102 further includes a coil 108, and when current is passed through the coil 108, the armature 104 is urged toward the pole piece 106 through the air gap A in a manner well known to those skilled in the art. A rod 109 transmits movement of the armature 104 to the valve element 96, so that when the solenoid 102 is actuated, the valve element 96 is urged from the valve seat 92 into sealing engagement with the valve seat 94, to thereby terminate fluid communication between the chamber 82 and the port 88 and to permit high pressure fluid communicated from the port 86 into the chamber 82. The solenoid 108 is actuated by an electronic control unit 110 which is responsive to the speed of either of the wheels controlled by the rear wheel brake 18. A speed sensor indicated schematically at 112 senses the speed of the rear wheel, and transmits an appropriate signal to the control unit 110. The control unit 110 contains appropriate logic which responds to the speed of the rear wheels 18 to generate a control signal actuating the solenoid 102 when an incipient skidding condition is sensed. Logic contained in the control unit 110 may be made pursuant to any of a number of designs, such as that disclosed in copending U. S. Patent application Ser. No. 227,748 filed Feb. 22, 1972, owned by the assignee of the present invention and incorporated herein by reference.

MODE OF OPERATION

Figure 2:
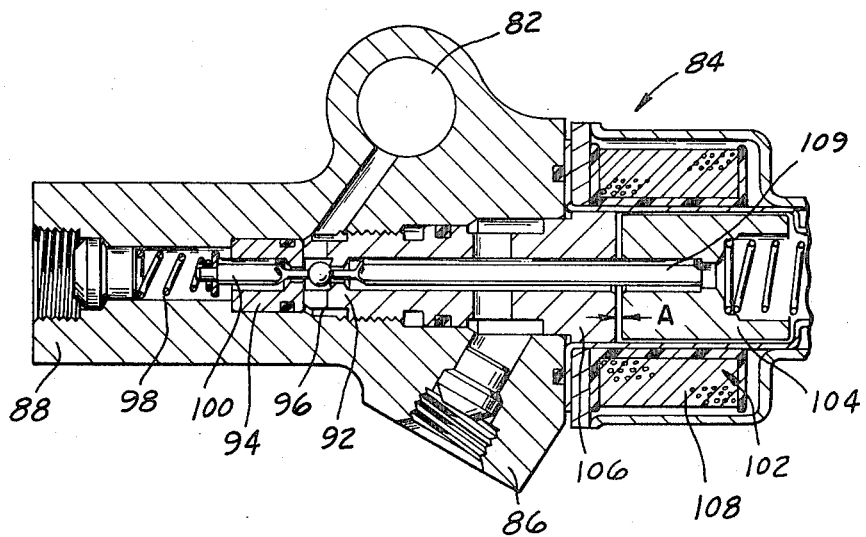
FIG. 2 is a cross-sectional view taken substantially along lines 2—2 of FIG. 1.

Various components of valve 10 are illustrated in FIGS. 1 and 2 in the positions which they assume when the brakes of the vehicle are released. When the vehicle operator initiates a brake application which does not require an adaptive braking cycle, fluid pressure developed in the master cylinder 20 is communicated into the chamber 34 and is immediately communicated to the rear wheel brakes 18 of the vehicle for actuating the latter through the axial passage 42 and the outlet chamber 36. However, since the end 44 of the piston 40 has a much greater area against which fluid pressure in the outlet chamber 36 may react than does the end 46 of the piston 40 exposed to the fluid pressure level in the chamber 34, at a relatively low pressure level the force differential created across the valve piston 40 due to these differential areas will overcome the force of the spring 58 to urge the valve proportioning piston 40 into sealing engagement with the poppet member 60 to thereby terminate further fluid communication through the passage 42. However, if the fluid pressure level in the inlet chamber 34 is increased, the valve will, of course, reopen to permit fluid to communicate into the outlet chamber 36; however, because of the differential areas across the valve piston 40, only a fraction of the fluid pressure increase in the chamber 34 will be communicated into the outlet chamber 36. Therefore, the fluid pressure level in outlet chamber 36 is less than the fluid pressure level in the inlet chamber 34 by a predetermined ratio. Further details of the construction and operation of the valve element 38, including their operation when the brakes of the vehicle are released, are more completely described in U. S. Pat. No. 3,556,607 owned by the assignee of the present invention and incorporated herein by reference.

When the electronic control unit 110 senses an incipient skidding condition of the wheel controlled by the brakes 18, the control unit 110 transmits a signal actuating the solenoid valve 102 to urge the valve element 96 into a position terminating fluid communication between the chamber 82 and the inlet of the pump 28 and initiating fluid communication between the high pressure fluid at the inlet port 86 and the chamber 82. High pressure fluid in the chamber 82 acts upon the end of the piston 76 to urge the latter to the left viewing FIG. 1, thereby driving the end of rod 80 into engagement with the end of the piston 40 and thereafter driving the piston 40 into sealing engagement with the poppet member 60 to thereby terminate fluid communication to the axial passage 42 to shut off fluid communication between the brakes 18 and the master cylinder 20 to thereby prevent a further buildup of fluid pressure in the brakes 18 which might cause the wheels controlled by the latter to skid. Further movement of the piston 76 urges the piston 40 away from the closed end 56 of the chamber 36, to thereby expand the volume of the outlet chamber 36. As the volume of the outlet chamber 36 expands, the pressure level in the brakes 18 is reduced, thereby relieving the latter and permitting the wheels controlled by the brakes 18 to spin up or reaccelerate so that they are no longer in danger of locking. When this occurs, the electronic control unit 110 terminates operation of the solenoid 102 to permit the spring 98 and plunger 100 to urge the valve element 96 away from the valve seat 94 and back into engagement with the valve seat 92 to thereby terminate communication of high pressure fluid into the chamber 82 and to vent the latter to the low pressure side of the power steering pump 28. When this occurs, the spring 58, and pressure in chamber 34 acting on end 46 of piston 40 urges the valve piston 40 and the piston 76 to the right viewing FIG. 1, to thereby reestablish fluid communication through the axial passage 42 to the rear wheel brakes 18.

DETAILED DESCRIPTION OF THE ALTERNATE EMBODIMENT

Figure 3:
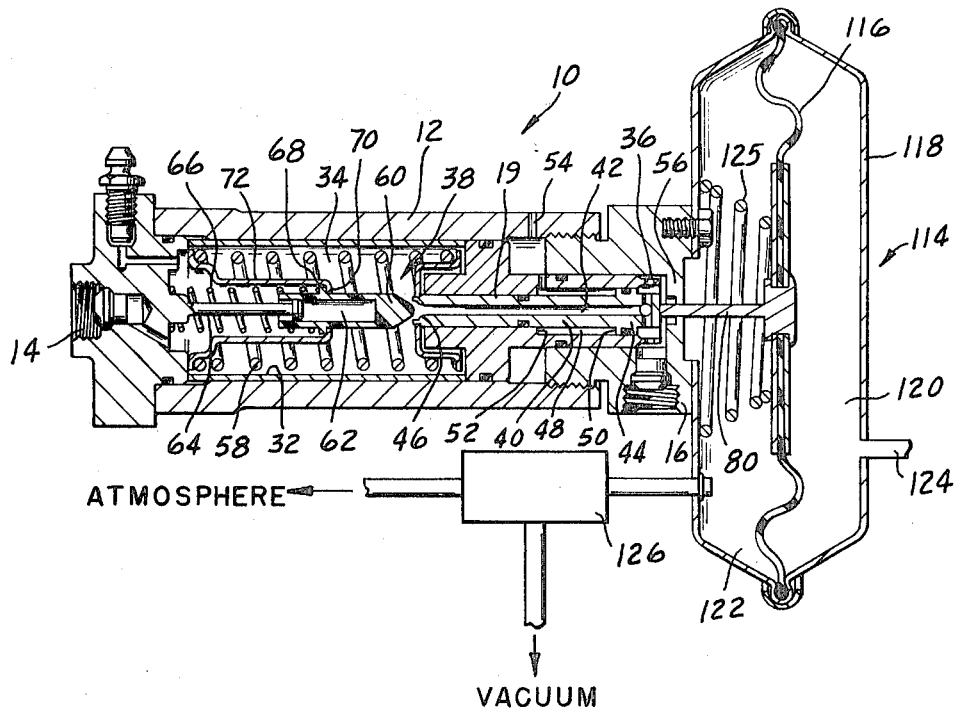
FIG. 3 is an illustration similar to FIG. 1, but illustrating another embodiment of our invention.

In the embodiment of FIG. 3, elements the same as those in the embodiments of FIGS. 1 and 2 retain the same reference numerals. The embodiment of FIG. 3 is identical to the embodiment of FIGS. 1 and 2, except that the high pressure fluid motor 74 in the embodiments of FIGS. 1 and 2 is replaced by a vacuum-operated fluid motor generally indicated by the numeral 114 in FIG. 3. A diaphragm 116 is mounted within a pressure can 118 and divides the latter into chambers 120 and 122. A vent 124 vents the chamber 120 to atmosphere at all times. A three-way solenoid-actuated valve 126, which is substantially the same as the valve 84 illustrated in FIG. 1, controls communication into the chamber 122. Three-way solenoid valve 126 is actuable from a first position terminating fluid communication between the chamber 122 and a vacuum source (not shown) and permitting the fluid communication from the atmosphere into the chamber 122, to a second position actuating the chamber 122 from atmosphere and communicating a vacuum from the vacuum source (which may be, for example, the manifold vacuum of the vehicle engine) into the chamber 122. When the chamber 122 is communicated with a vacuum source, the high pressure atmospheric air in the chamber 120 urges the diaphragm 116 to the left viewing FIG. 3, so that the rod 80 is urged into engagement with the valve proportioning piston 40. Further movement of the diaphragm 116 actuates the valve piston 40 in a manner identical to that described in connection with the preferred embodiment discussed hereinabove. A spring 125 is provided to urge the diaphragm 116 back to its normal position when the adaptive braking cycle is terminated and air at atmospheric pressure is again communicated into the chamber 122. Of course it will be obvious to those skilled in the art that alternatively both sides of the diaphragm 116 may be initially communicated to the vacuum source and that chamber 122 be communicated to atmosphere when the adaptive braking cycle is initiated.

We claim:
1. In a braking system for a wheeled vehicle having a fluid pressure actuated brake controlling one of the wheels of the vehicle:

operator-operated pressure developing means for developing braking pressure for actuating said brake;

proportioning valve means having an inlet communicated to said pressure developing means and an outlet communicated to said brake, said proportioning valve means permitting uninhibited fluid communication between said inlet and outlet until a first fluid pressure level is attained at said inlet whereupon said proportioning valve means proportions fluid communication from said inlet to said outlet to establish a lower fluid pressure level at said outlet than at said inlet;
  control means responsive to an incipient skidding condition of the wheel controlled by said brake and generating an output signal in response to said incipient skidding condition; and
  electrically actuated means responsive to said control signal for closing said valve means to prevent fluid communication from said inlet to said outlet upon generation of said control signal;
  said electrically actuated means including a fluid motor having a pressure differential responsive piston operatively associated with said proportioning valve means, and electrically actuated valve means responsive to said control signal to communicate a pressure differential across said piston, whereupon said piston moves to close said proportioning valve means;
  said electrically actuated valve means communicating one side of said piston with a source of vacuum when said control signal is generated, whereupon atmospheric pressure acting on the other side of said piston actuates the latter.

2. In a braking system for a wheeled vehicle having a fluid pressure actuated brake controlling one of the wheels of the vehicle;
  operator-operated pressure developing means for developing braking pressure for actuating said brake;

proportioning valve means having an inlet communicated to said pressure developing means and an outlet communicated to said brake, said proportioning valve means permitting uninhibited fluid communication between said inlet and outlet until a first fluid pressure level is attained at said inlet whereupon said proportioning valve means proportions fluid communication from said inlet to said outlet to establish a lower fluid pressure level at said outlet than at said inlet;
  control means responsive to an incipient skidding condition of the wheel controlled by said brake and generating an output signal in response to said incipient skidding condition; and
  electrically actuated means responsive to said control signal for closing said valve means to prevent fluid communication from said inlet to said outlet upon generation of said control signal;
  said electrically actuated means including a fluid motor having a pressure differential responsive piston operatively associated with said proportioning valve means, and electrically actuated valve means responsive to said control signal to communicate a pressure differential across said piston, whereupon said piston moves to close said proportioning valve means;
  said proportioning valve means including a housing defining a bore therewithin, valve elements dividing said bore into an inlet chamber communicated to said inlet between said valve elements and one end of said bore and an outlet chamber communicated to said outlet between said valve element and the other end of said bore; said valve elements having to and from sealing engagement with one another to proportion fluid communication between said chambers;
  said piston moving from a first position permitting said valve elements to move relative to one another to a second position maintaining said valve elements in sealing engagement with one another, further movement of said piston moving one of said valve elements away from said other end of said bore to increase the volume of said outlet chamber, whereby the fluid pressure level in the latter communicated to said brake is reduced.

3. The invention of claim 2:
  said housing defining a compartment therewithin between said other end of said bore and the end of said housing, said piston being slidable in said compartment and including a rod extending through said other end of the bore for engagement with said one valve element when said piston moves to said second position.

4. In a braking system for a wheeled vehicle having a fluid pressure actuated brake controlling one of the wheels of the vehicle:
  operator-operated pressure developing means for developing braking pressure for actuating said brake;

proportioning valve means having an inlet communicated to said pressure developing means and an outlet communicated to said brake, said proportioning valve means permitting uninhibited fluid communication between said inlet and outlet until a first fluid pressure level is attained at said inlet whereupon said proportioning valve means proportions fluid communication from said inlet to said outlet to establish a lower fluid pressure level at said outlet than at said inlet;

control means responsive to an incipient skidding condition of the wheel controlled by said brake and generating an output signal in response to said incipient skidding condition; and electrically actuated means responsive to said control signal for closing said valve means to prevent fluid communication from said inlet to said outlet upon generation of said control signal;

said proportioning valve means including a housing defining a bore therewithin, valve elements dividing said bore into an inlet chamber communicated to said inlet port between said valve elements and one end of said bore and an outlet chamber between said valve elements and the other end of said bore communicated to said outlet port, said valve elements moving to and from sealing engagement with one another to proportion fluid communication between said chambers;

said electrically actuated means being effective to maintain said valve elements in sealing engagement with one another and to move said valve elements away from the other end of said bore to increase the volume of said outlet chamber, whereby the fluid pressure level in the latter communicated to said brake is reduced.

5. The invention of claim 4:

said electrically actuated means including a plunger extending through the other end of said bore, said plunger urging said valve elements into sealing engagement with one another and away from the other end of the bore upon generation of said control signal.

* * * * *